(12) United States Patent
Cai et al.

(10) Patent No.: US 7,822,280 B2
(45) Date of Patent: Oct. 26, 2010

(54) EPIPOLAR GEOMETRY-BASED MOTION ESTIMATION FOR MULTI-VIEW IMAGE AND VIDEO CODING

(75) Inventors: Hua Cai, Beijing (CN); Jian-guang Lou, Beijing (CN); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 806 days.

(21) Appl. No.: 11/653,587

(22) Filed: Jan. 16, 2007

(65) Prior Publication Data

US 2008/0172384 A1  Jul. 17, 2008

(51) Int. Cl.
*G06K 9/46* (2006.01)
*G06K 9/00* (2006.01)
*H04N 11/02* (2006.01)

(52) U.S. Cl. .................... 382/238; 382/154; 348/394.1; 375/240.16

(58) Field of Classification Search .................. 382/154, 382/232, 236, 238, 305; 375/240.12, 240.16; 348/394.1, 415.1
See application file for complete search history.

(56) References Cited

U.S. PATENT DOCUMENTS

| | | | |
|---|---|---|---|
| 7,286,689 B2 * | 10/2007 | Damera-Venkata et al. | 382/107 |
| 7,463,778 B2 * | 12/2008 | Damera-Venkata | 382/236 |
| 2002/0106120 A1 * | 8/2002 | Brandenburg et al. | 382/154 |
| 2005/0031035 A1 * | 2/2005 | Vedula et al. | 375/240.12 |
| 2005/0243921 A1 * | 11/2005 | Au et al. | 375/240.12 |

OTHER PUBLICATIONS

J.-G. Lou, H. Cai, and J. Li, "A real-time interactive multi-view video system," in Proc. ACM Int. Conf. Multimedia, Singapore, Nov. 2005, pp. 161-170.
Zitnick, Kang, Uyttendaele, Winder, Szeliski,"High-quality video interpolation using a layered representation," in Proc. ACM Conf. Comput. Graphics, 2004, pp. 600-608.
Smolic, McCutchen, "3DAV exploration of video-based rendering technology in MPEG," IEEE Trans. Circuits Syst. Video Technol., vol. 14, No. 3, pp. 348-356, Mar. 2004.
Smolic, Kauff, "Interactive 3-D video representation and coding technologies," Proc. IEEE, vol. 93, Advances in Video Coding and Delivery, No. 1, pp. 98-110, Jan. 2005.
Advanced Video Coding, Part 10, ISO/IEC 14996-10 AVC, ISO/IEC, Oct. 2004.

(Continued)

*Primary Examiner*—Daniel G Mariam
(74) *Attorney, Agent, or Firm*—L. Alan Collins; Collins & Collins Incorporated

(57) ABSTRACT

Described is fast motion estimation based upon epipolar geometry, which can be used in compressing multi-view video. An epipolar line is computed based on a point (e.g., a centroid point) in a macroblock to be predicted, and a temporary starting point in an image is determined, such as a median predicted search center. A search starting point is further determined based on the temporary starting point and the epipolar line, e.g., a point on the epipolar line corresponding to an intersecting line that is projected orthogonally from the temporary point to the epipolar line. A motion estimation mechanism searches the search space to produce a motion vector. The search may be conducted starting at the search starting point in a reduced search area located around the epipolar line, e.g., a local diamond search and/or rotated unsymmetrical rood-pattern search.

17 Claims, 7 Drawing Sheets

OTHER PUBLICATIONS

"Survey of Algorithms Used for Multi-View Video Coding (MVC)," ISO/IEC JTC1/SC29/WG11, Int. Standards Org./Int. Electrotech. Comm. (ISO/IEC), Jan. 2005, Doc. N6909.

Z. B. Chen, P. Zhou, and Y. He, "Fast Integer Pel and Fractional Pel Motion Estimation for JVT," JVT-F017, 6th Meeting, Awaji, Japan, Dec. 2002.

L. M. Po and W. C. Ma, "A novel four-step search algorithm for fast block motion estimation," IEEE Trans. Circuits Syst. Video Technol., vol. 6, No. 3, pp. 313-317, Jun. 1996.

S. Zhu and K.-K. Ma, "A new diamond search algorithm for fast blockmatching motion estimation," IEEE Trans. Image Process., vol. 9, No. 2, pp. 287-290, Feb. 2000.

A. Chimienti, C. Ferraris, and D. Pau, "A complexity-bounded motion estimation algorithm," IEEE Trans. Image Process., vol. 11, No. 4, pp. 387-392, Apr. 2002.

Y. Nie and K.-K. Ma, "Adaptive rood pattern search for fast blockmatching motion estimation," IEEE Trans. Image Process., vol. 11, No. 12, pp. 1442-1449, Dec. 2002.

Ates, Altunbasak, "SAD reuse in hierarchical motion estimation for the H.264 encoder," in Proc. IEEE Int. Conf. Acoust., Speech, Signal Process., Mar. 2005, pp. 905-908.

Information Technology-Coding of Audio-Visual Objects, Part 1: Systems, ISO/IEC JTC1/SC29/VVG11, ISO/IEC, May 1998.

H. Aydinoglu and M. H. Hayes, "Compression of multi-view images," in Proc. IEEE Int. Conf. Image Process., Austin, TX, Nov. 1994, pp. 385-389.

López, Kim, Ortega, Chen, "Block-based illumination compensation and search techniques for multiview video coding," Picture Coding Symp., San Francisco, CA, Dec. 2004.

R. Hartley and A. Zisserman, "Multiple View Geometry," Jun. 1999.

K. Hata and M. Etoh, "Epipolar geometry estimation and its application to image coding," in Proc. IEEE Int. Conf. Image Process., Kobe, Japan, Oct. 1999, pp. 472-476.

E. Martinian, A. Behrens, J. Xin, and A. Vetro, "View synthesis for multiview video compression," presented at the Picture Coding Symp., Beijing, China, May 2006.

S. Yea, J. Oh, S. Ince, E. Martinian, and A. Vetro, "Report on core experiment CE3 of multiviewcoding," presented at the JVT-T123, 20th Meeting, Klagenfurt, Austria, Jul. 2006.

Lu, Cai, Lou, Li, "An effective epipolar geometry assisted motion-estimation technique for multi-view image coding," in Proc. IEEE Int. Conf. Image Process., Oct. 2006.

Z. Zhang, "Determine the epipolar geometry and its uncertainty: A review," Int. J. Comput. Vis., vol. 27, pp. 161-195, received Jul. 10, 1996, published Mar. 1998.

Requirements on Multi-View Video Coding v.8,, ISO/IEC JTC1/SC29/ WG11, ISO/IEC, Jul. 2007.

Yang, "An effective variable block-size early termination algorithm for H.264 video coding," IEEE Trans. Circuits Syst. Video Technol., vol. 15, No. 6, pp. 784-788, Jun. 2005.

Ma, Qiu, "Unequal-arm adaptive rood pattern search for fast block-matching motion estimation in the JVT/H.26L," Proc. IEEE Int. Conf. Image Process., Sep. 2003, pp. 901-904.

R. I. Hartley, "In the defense of eight-point algorithm," IEEE Trans. Pattern Anal. Mach. Intell., vol. 19, No. 6, pp. 580-593, Jun. 1997.

Z. Zhang and C. Loop, "Estimating the fundamental matrix by transforming image points in projective space," Comput. Vis. Image Understanding, vol. 82, pp. 174-180, May 2001.

Zitnick, Kang, Uyttendaele, Winder, Szeliski, "High-quality video view interpolation using a layered representation," ACM SIGGRAPH and ACM Trans. on Graphics, Aug. 2004.

Information Technology-Coding of Audio-Visual Objects, Part 2: Visual, ISO/IEC JTC1/SC29/WG11, ISO/IEC, Dec. 1, 2001.

* cited by examiner

EPIPOLAR GEOMETRY-BASED MOTION ESTIMATION FOR MULTI-VIEW IMAGE AND VIDEO CODING

BACKGROUND

Multi-view video or free viewpoint video refers to applications that enable users to watch a static or dynamic scene from different viewing perspectives. Generally, to provide a smooth multiple-perspective viewing experience, content producers capture a distinct scene with ideal quality from multiple camera positions arranged at different angles. For example, a convergent multi-view camera setup may have cameras generally positioned equidistant from a point in a scene, with the cameras aimed inward to capture the same scene from different angles. Such a setup often is widely used in movies, advertising, educational video, sports events, and general event broadcasting.

In addition to the general application, the simultaneous multiple video streams that are output from multi-view cameras are also often referred to as multi-view video. A multi-view video sequence can be naturally regarded as a temporal sequence of special visual effect snapshots, captured from different viewpoints at multiple times. Such a special snapshot is comprised of the still images taken by multiple cameras at one certain time instance, which is essentially a multi-view image sequence.

While multi-view image/video is capable of providing an exciting viewing experience, it is achieved at the expense of large storage and transmission bandwidth. As a result, a highly efficient compression scheme is needed. In many multi-view compression schemes, inter-viewpoint prediction is used to exploit the inter-viewpoint correlation (for example, predicting frame $f_i(j)$ from frame $f_{i+1}(j)$). However, the inter-viewpoint prediction also significantly increases computational cost. This is generally because inter-viewpoint redundancy has to be exploited by conducting inter-viewpoint motion estimation across different views, and motion estimation is usually the most time-consuming component in a conventional video encoder, particularly when variable block-size motion estimation is performed.

Although numerous fast motion estimation algorithms have been considered for alleviating the heavy computational load of motion estimation while maintaining its prediction performances, these fast motion estimation algorithms essentially proposed to accelerate temporal prediction, and thus may inefficiently render the direct application to inter-viewpoint prediction. This is because differences in the various application scenarios dictate significantly different motion estimation design principles and the associated motion prediction performance. In fact, to track the large and irregular (depth-dependent) motion typical for convergent multi-view camera setups, traditional full-search motion estimation and most fast-motion estimation algorithms have to greatly amplify the motion refinement grid to prevent the search points from dropping into a local minimum in the earlier search stages. Otherwise, the resulting coding efficiency will significantly drop.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards fast motion estimation via epipolar geometry, which can be used in multi-view video. A point in a current macroblock to be predicted (e.g., the centroid point) is determined, and an epipolar line computed based on that point. A temporary starting point of a macroblock to be searched is also determined, e.g., a median predicted search center of a macroblock to be searched. A search starting point is then further determined based on the temporary starting point and the epipolar line. For example, the temporary starting point may be a median predicted search center corresponding to a macroblock, and the search starting point may be a point on the epipolar line that is projected substantially orthogonally from the temporary point to the epipolar line. A search may be conducted starting at the search starting point in a search area located around the epipolar line, e.g., a local diamond search and/or rotated unsymmetrical rood-pattern search.

In one example implementation, a first module computes the epipolar line, and a second module coupled to the first module computes the search starting point, e.g., on the epipolar line. A third module coupled to the second module determines a search space, e.g., aligned on the epipolar line. A motion estimation mechanism searches the search space to produce a motion vector.

By computing epipolar line parameters corresponding to a macroblock and determining a search point on the epipolar line, a search can be conducted to determine a matching point and a motion vector corresponding to the matching point. The searching may include conducting a local diamond search centered at the search point, conducting an unsymmetrical rood pattern search, and/or conducting a recursive local diamond search.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a motion estimation framework that accelerates inter-viewpoint prediction based on the principles of epipolar geometry and using the position of the cameras, which is known. In this manner, as described below, solid geometry constraints may be explicitly employed in an advanced video coding standard for improved compression. Also described is an incremental computation method for epipolar line equation and rood search pattern, for further acceleration.

Although one implementation exemplified herein generally describes an example framework for fast motion estimation framework in an H.264/AVC environment, (where H.264/AVC is a contemporary video coding standard as described in Joint Final Committee Draft (JFCD) of Joint Video Specification (ITU-T Rec. H.264|ISO/IEC 14496-10 AVC), 2002), it will be understood that the concepts, technology and aspects described herein are not limited to H.264/AVC, but additionally apply to other video coding technologies, including existing ones, and those not yet available.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and networking in general.

Figure 1:
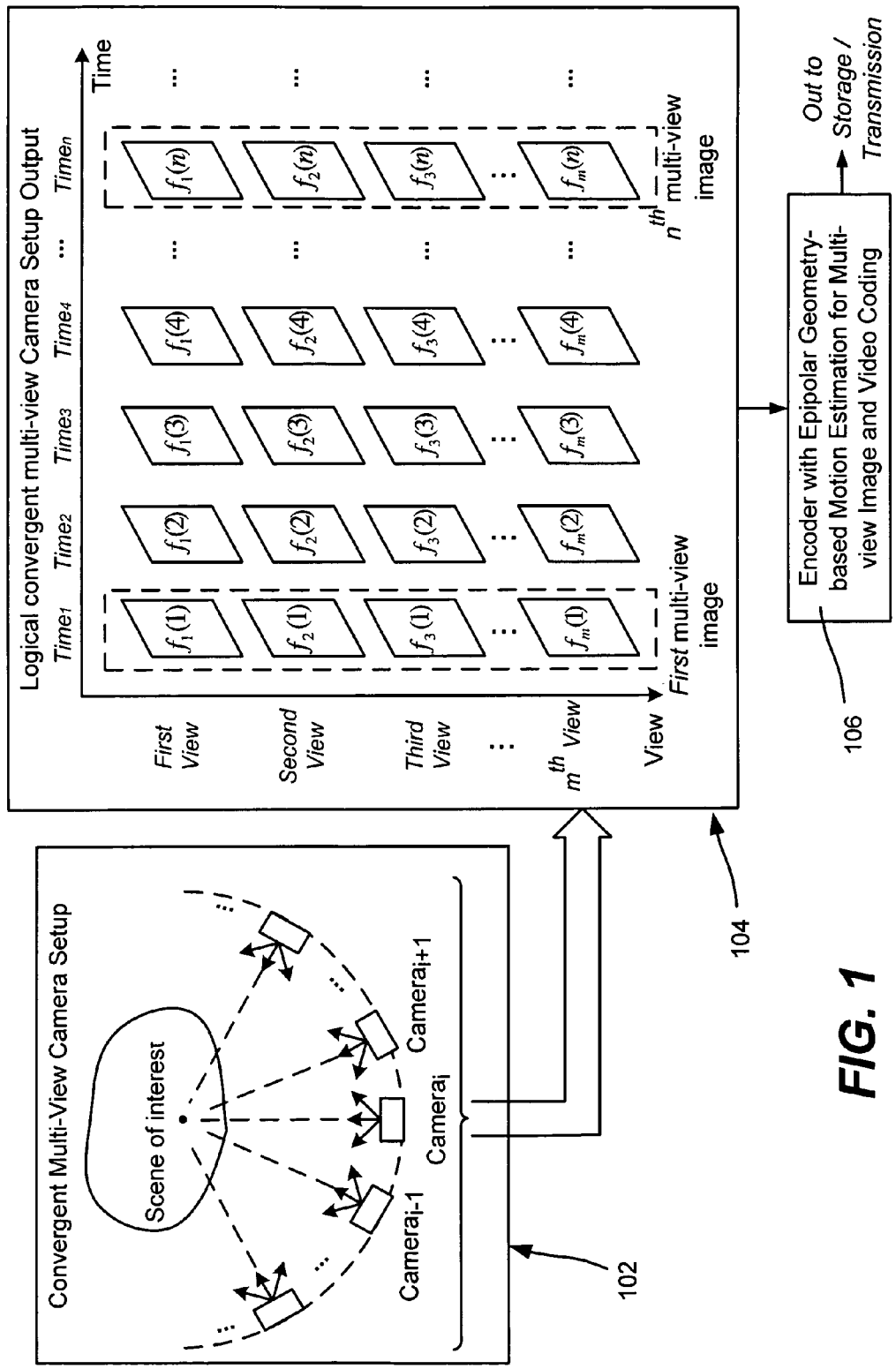
FIG. 1 is an example representation of a convergent multi-view camera setup that outputs multi-view video output to an encoder that is configured with epipolar geometry-based motion estimation technology.

FIG. 1 shows a convergent multi-view camera setup 102 that outputs multi-view video output 104 to an encoder 106 that is configured with epipolar geometry-based motion estimation technology. As logically represented in FIG. 1, the output 104 represents each camera corresponding to a view (First View-$m^{th}$ View) at each time (Time1-Time$_n$) whereby various multi-view images are present for video coding. Note that a lesser number of cameras may be used to provide the same or a greater number of streams, if, for example, one or more of the cameras moves to a new position fast enough relative to the captured image to be considered the same "time" that the image is captured.

As used herein, a multi-view video sequence thus comprises m conventional video streams captured from m viewpoints (e.g., $f_i(j)$ denotes the $j^{th}$ frame of the $i^{th}$ view), while a typical multi-view image sequence can be constructed by the still images from m viewpoints at any time instant, e.g., corresponding to the first through the $n^{th}$ multi-view images. The encoder 106 encodes the multi-view output as described below, and sends the encoded output to storage and/or transmission for subsequent decoding.

Figure 2:
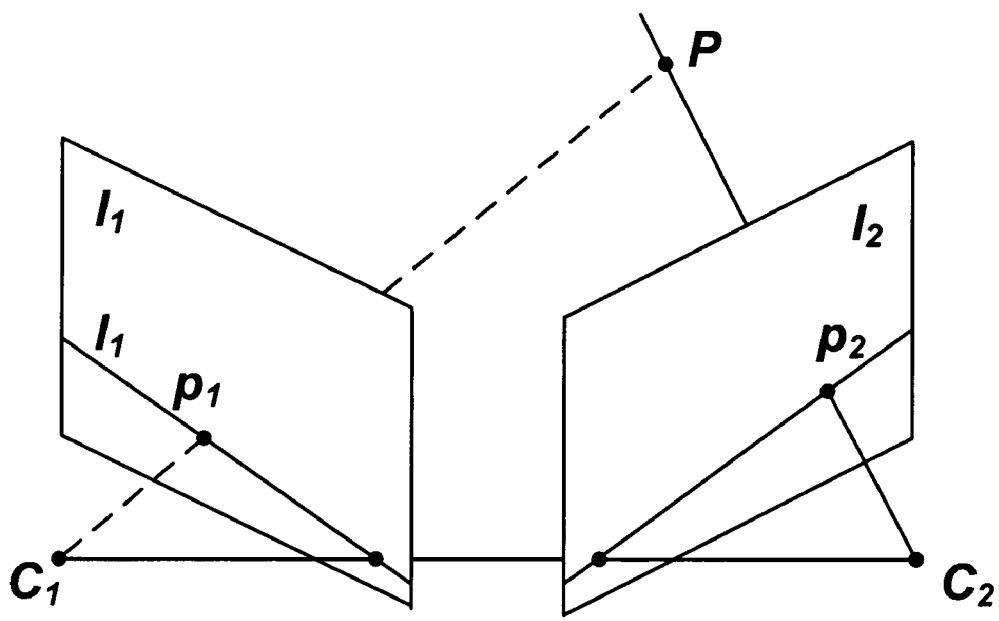
FIG. 2 is an example representation of a stereo imaging setup showing image planes, a point's projection on the planes, and an epipolar line computed therefrom.

Turning to FIG. 2, epipolar geometry, (extensively studied in computer vision), as a specific example of multi-view geometry, is an available geometry constraint between a stereo pair of images of a single scene. By way of example, consider the stereo imaging setup as shown in FIG. 2, where $C_1$ and $C_2$ are the optical centers of the first and the second cameras, and the plane $I_1$ and $I_2$ are the first and the second image planes, respectively. Given a point P in a three-dimensional space, P's projection on the second image plane is denoted as $P_2$. According to epipolar geometry, its corresponding point $P_1$ in the first image is constrained to lie on the line labeled $l_1$, which is referred to as the epipolar line of $P_2$. The epipolar constraint can be formulated as:

$$\tilde{P}_1^T \cdot F \cdot \tilde{P}_2 = \tilde{P}_1^T \cdot l_1 = 0 \qquad \text{equation (1)}$$

where $\tilde{P}_1$ and $\tilde{P}_2$ are the homogeneous coordinates of $P_1$ and $P_2$, and F is referred to as the fundamental matrix. The fundamental matrix comprises a 3×3 matrix, determined by the intrinsic matrix and the relative position of the two cameras. (Note that if camera geometry is calibrated, which is the general case when both intrinsic and extrinsic camera parameters are known, the fundamental matrix can be calculated from camera projective matrices.) Therefore, from the above equation (1), once F is available, the equation of epipolar line $l_1$ can be computed.

Figure 3:
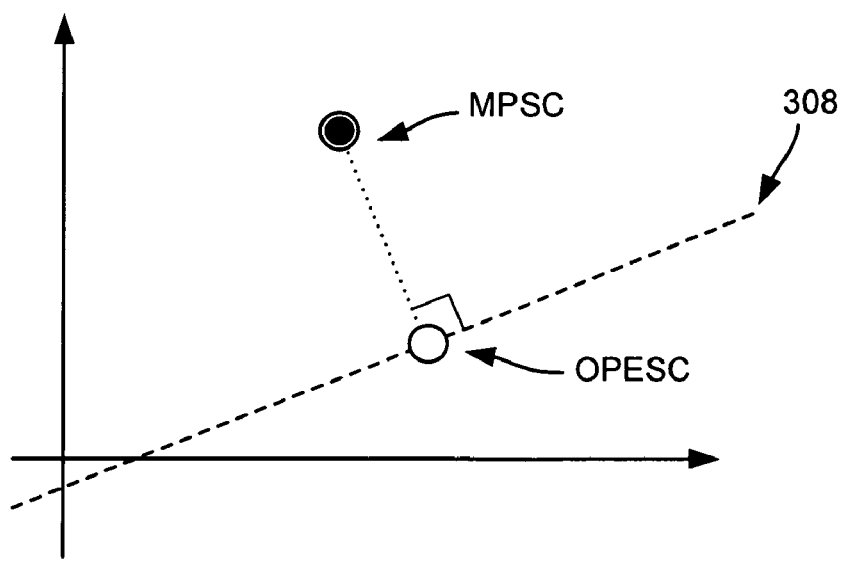
FIG. 3 is an example representation of transferring a conventional search starting point to a search starting point based on an orthogonal projection to the epipolar line.

As generally represented in FIG. 3, one aspect of an epipolar geometry-based fast motion estimation framework is directed towards transferring a conventional search starting point, e.g., starting the commonly-adopted median predicted search center (MPSC) to obtain another starting point. In one implementation as represented in FIG. 3, the other starting point comprises the MPSC's orthogonal projection point (i.e., orthogonal projection epipolar search center (OPESC)) on the corresponding epipolar (dashed) line 308. In other words, the epipolar line is computed, and the old computed point (MPSC) is mathematically moved (at ninety degrees in this implementation) to a new point (OPESC) on the epipolar line 308.

Figure 4:
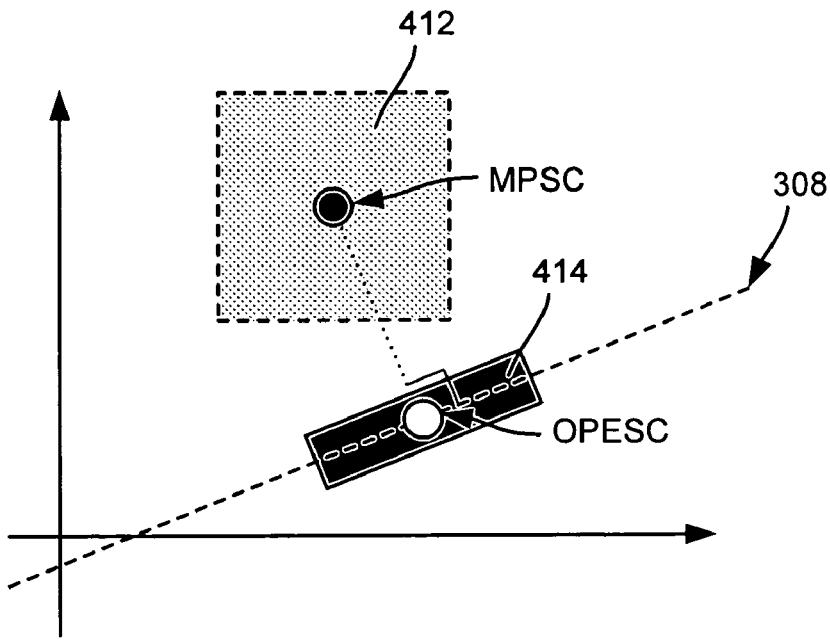
FIG. 4 is a representation of an example reduced search space aligned on the epipolar line.

Then, in a second aspect, as generally represented in FIG. 4, the motion search may be performed in a largely reduced epipolar line-aligned search space, in one implementation centered at OPESC. In the example of FIG. 4, for purposes of comparison, the traditional (no longer used) search space is represented by the lightly shaded block 412, while the new, reduced search space is represented by the somewhat darker shaded block 414. For example, the traditional search space may have been 32×32 pixels, while the new search space may be 32×4 pixels, aligned on the epipolar line, facilitating faster searches. Note that the same type of search pattern may be used, e.g., a diamond search pattern, but the search is bounded by the reduced search space.

Figure 5:
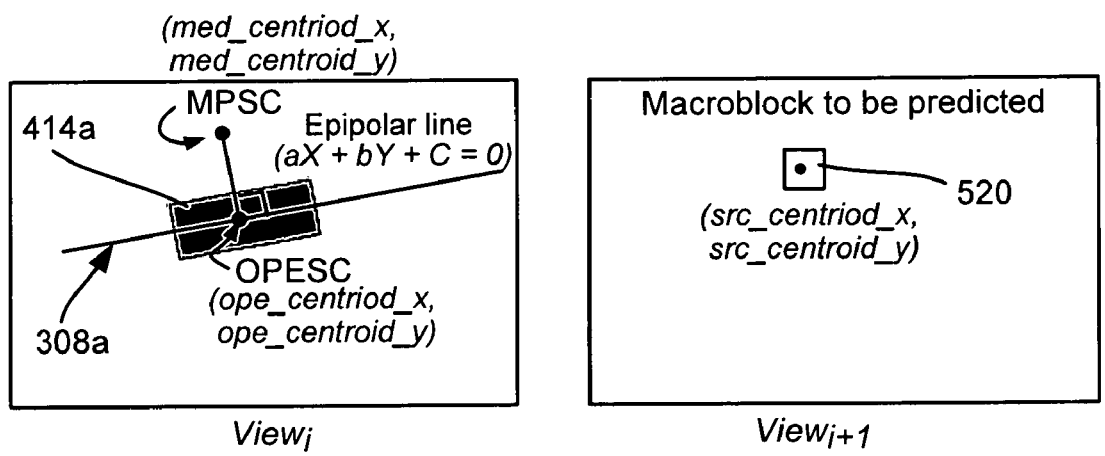
FIG. 5 shows an illustrative example of two views, including a search area in one view determined via epipolar geometry from a macroblock in the other view.

More particularly, as represented in FIG. 5, two neighboring views, View$_i$ and View$_{i+1}$, are shown. Note that the input fundamental matrix relating the views is referred to in this example as F. Given the coordinates of the centroid of a current macroblock 520 to be predicted in View$_{i+1}$, the corresponding epipolar line equation (aX+bY+c=0) in View$_i$ can be computed by multiplying F by the homogeneous centroid coordinates using the above equation (1). In FIG. 5, the computed epipolar line is labeled 308a and the starting search area labeled 414a.

After calculating the epipolar line equation, the starting search point OPESC (ope_centroid_x(y)) and its corresponding initial MV (ope_mv_x(y)) for the current macroblock under search (src_centroid_x(y)), are derived from the MPSC point (med_centroid_x(y)) given by the median predicted motion vector MV (med_mv_x(y)) as follows:

$$\text{med\_centroid\_}x(y) = \text{src\_centroid\_}x(y) + \text{med\_mv\_}x(y) \qquad \text{equation (2)}$$

$$\text{ope\_centroid\_}x(y) = ORTHO\_PROJ(\text{med\_centroid\_}x(y), a, b, c) \qquad \text{equation (3)}$$

$$\text{ope\_mv\_}x(y) = \text{ope\_centroid\_}x(y) - \text{src\_centroid\_}x(y). \qquad \text{equation (4).}$$

Moreover, as a larger matching window is desirable to achieve reliable matching, in one example embodiment the equations (2), (3), and (4) may be applied only to the motion search at the macroblock level, e.g., for a block-size of 16×16. Although fine-grained block motion search for sub-macroblocks are supported in some recent video coding standards, e.g., MPEG-4 and H.264/AVC, in this example embodiment, the MPSC is only transformed to obtain the OPESC for the macroblock level motion search, so that the prediction outliers from small matching windows or sub-macroblocks can be prevented from destroying the smooth motion field.

In addition to techniques of fast motion estimation that exploit the properties of epipolar geometry, the techniques provide an effective and generally applicable motion estimation technique. As a result, the technology also works well with full search and fast motion estimation algorithms for multi-view image and video coding to achieve a reasonable tradeoff between quality and complexity.

Figure 6:
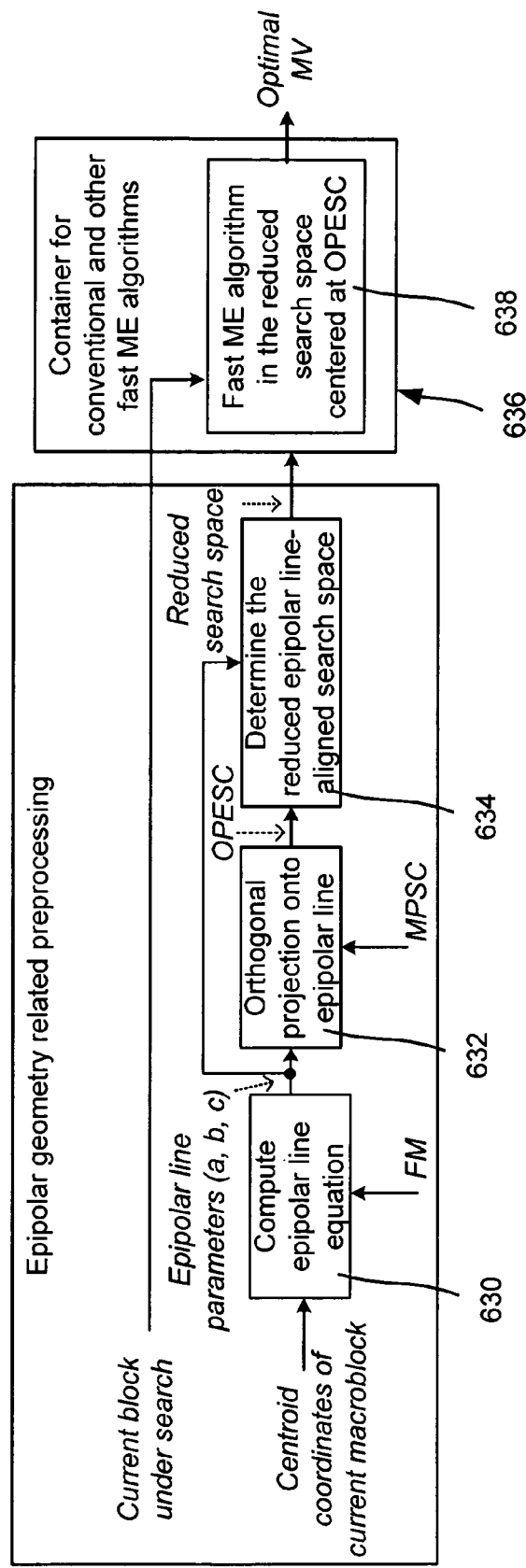
FIG. 6 is a block diagram representing example components used in fast motion estimation.

FIG. 6 shows an integration interface for plugging in the existing fast motion estimation algorithms or motion search heuristics to leverage the advantages of the fast motion estimation framework. The modules 630, 632 and 634 in FIG. 6 are example normative modules for preparing the epipolar geometry-based information, as described above. Following the normative procedure modules 630, 632 and 634, the block 636 represents a container in which various fast motion estimation algorithms can be included and conducted, including a fast motion estimation search algorithm 638 that operates in a reduced search region flexibly centered at OPESC, as also described above.

Figure 7:
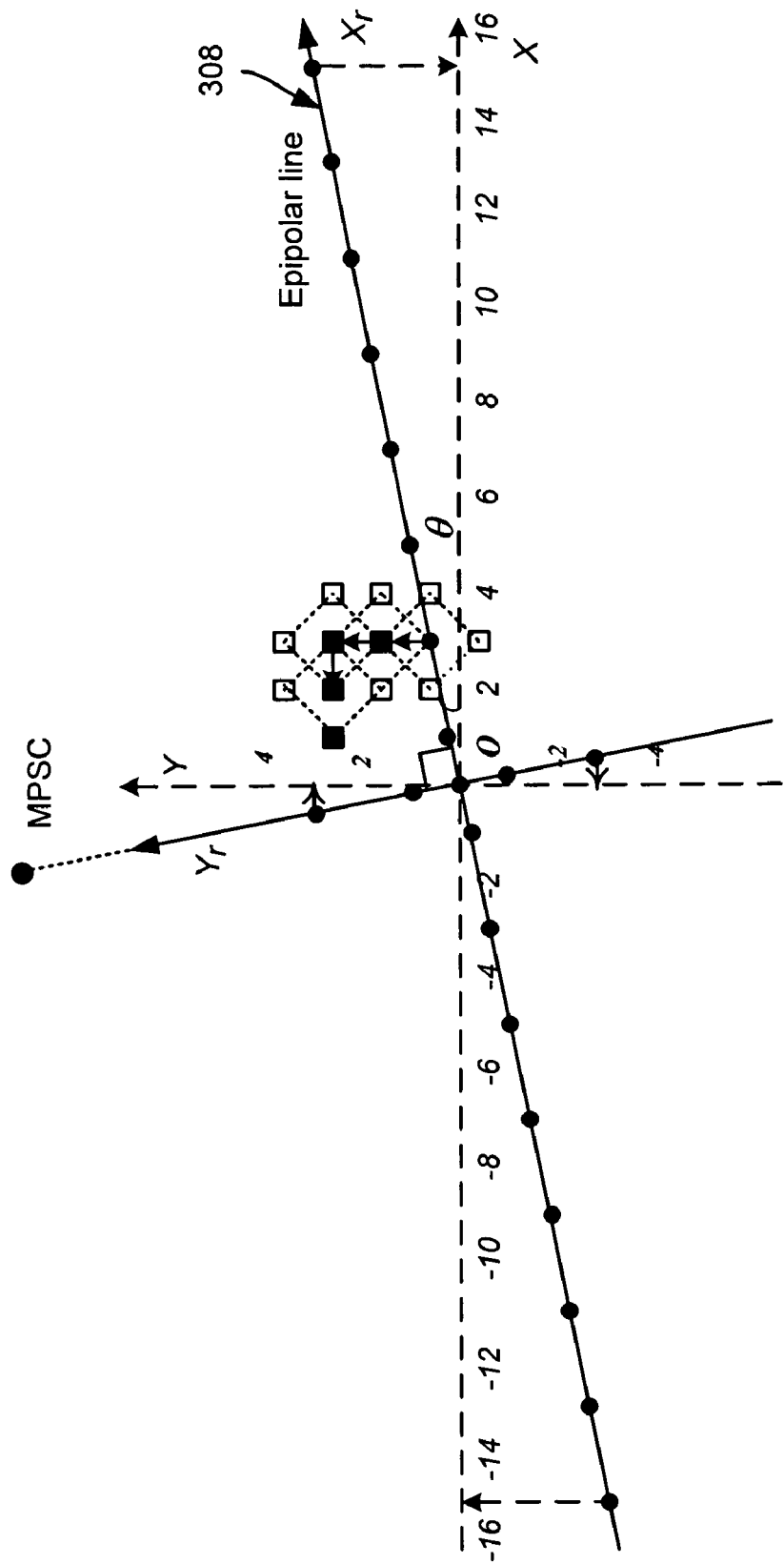
FIG. 7 is a graphical representation of a search process and search patterns in an example implementation.

FIG. 7 is a graphical representation of a major search process and search patterns of an example implementation. In the example of FIG. 7, a diamond search is centered first at the starting search point OPESC. In this example, one practical implementation of the fast motion estimation framework primarily comprises two search processes. A first search process is a rotated unsymmetrical rood-pattern search with a sampling grid size of two, represented as the dots in FIG. 7. More specifically, in one embodiment, the horizontal search range (HSR, or X) is set to sixteen (16) and the vertical search range (VSR, or Y) is set to four (4) as the size of the adopted unsymmetrical rood pattern, in order to track the principal component of true motion along the epipolar line 308 by using a largely reduced number of initial search candidates.

A second search process comprises a recursive local diamond search for maximum refinement multiplied by four (4) to bring the motion search to the minimum matching cost point, represented by the squares in FIG. 7.

Figure 8A:
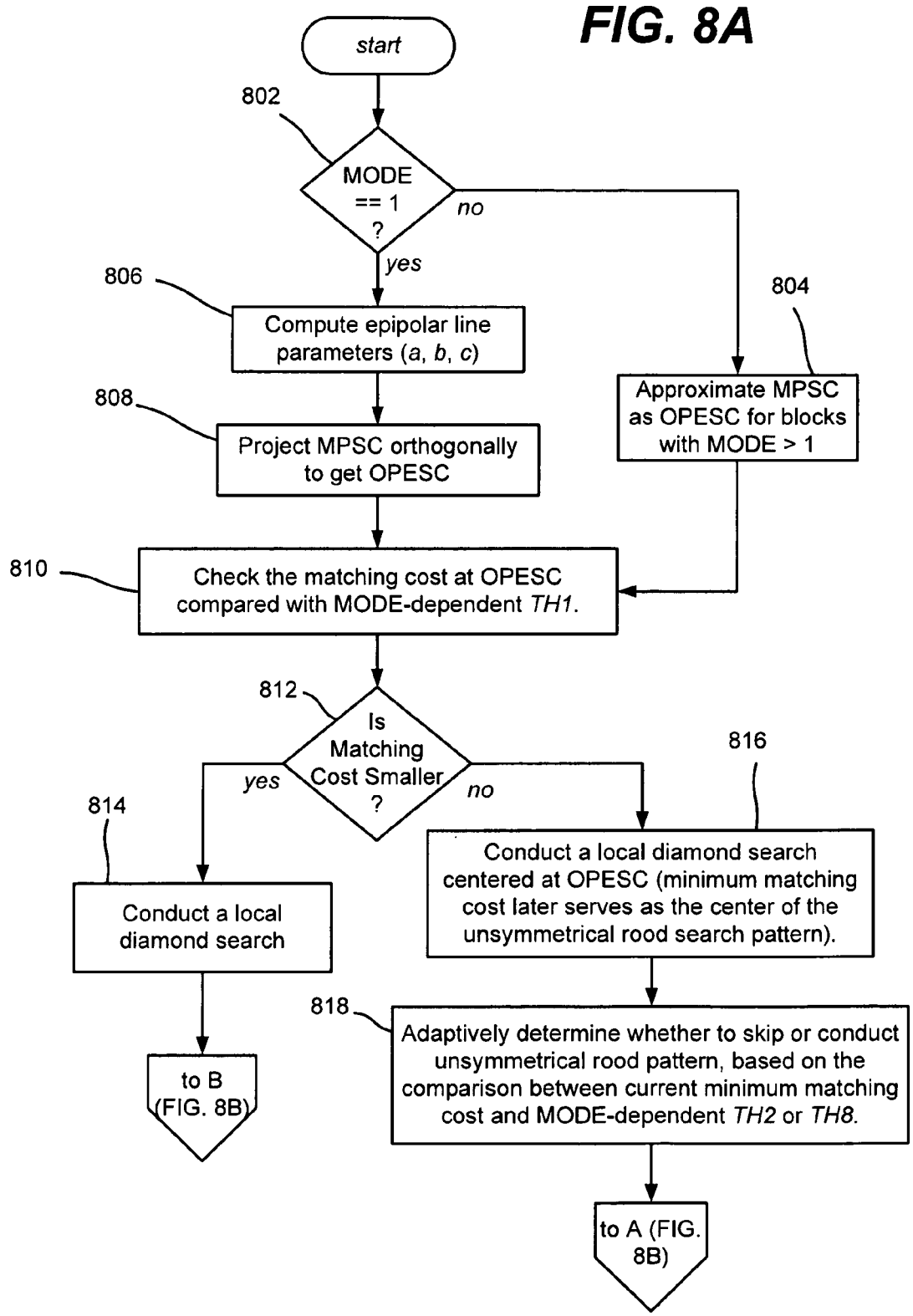
FIGS. 8A and 8B comprise a flow diagram exemplifying steps that may be taken to accomplish fast motion estimation in an example H.264/AVC environment.
Figure 8B:
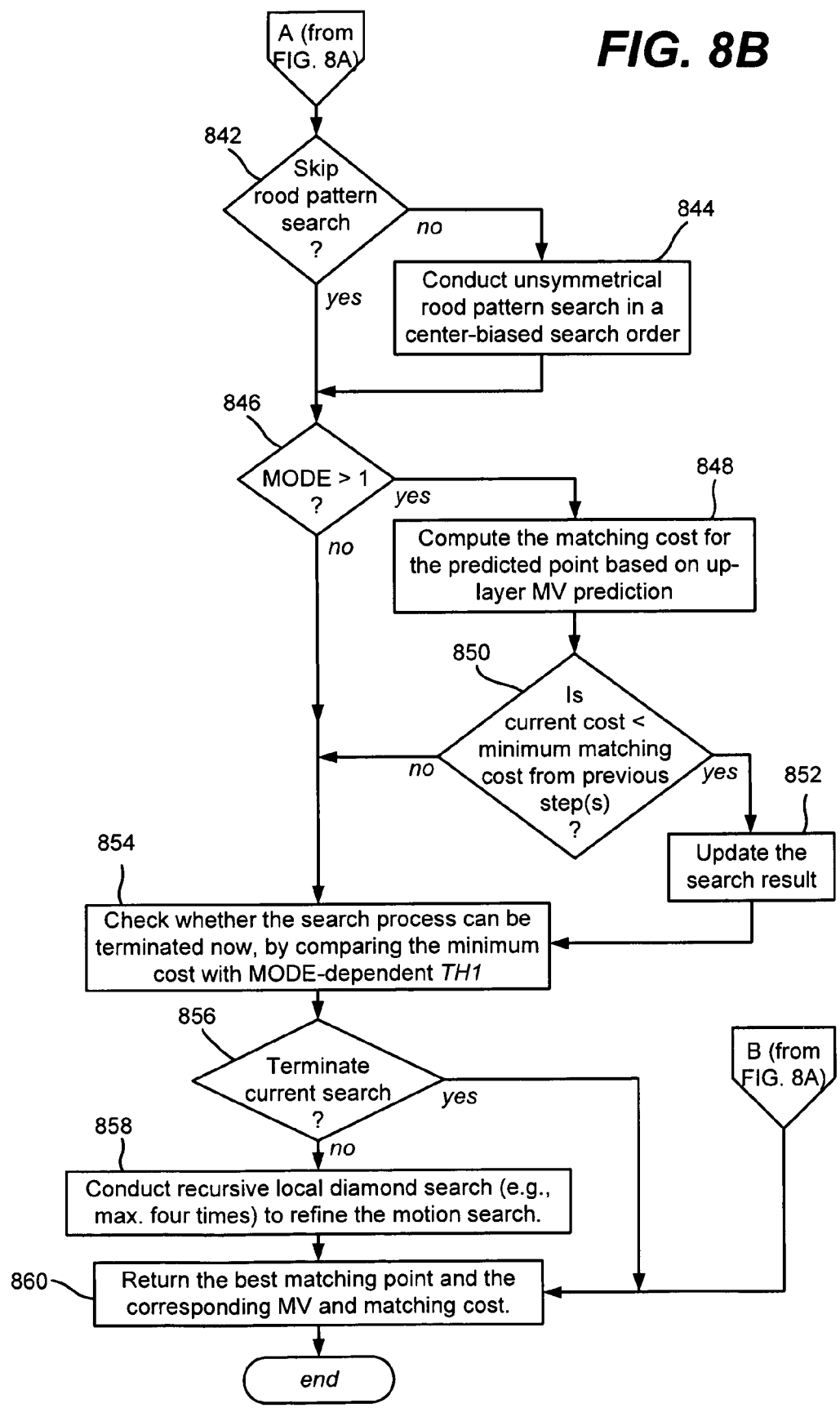

FIGS. 8A and 8B illustrate an example adaptive and fast implementation of an epipolar geometry-based fast motion estimation framework in an H.264/AVC environment. More particularly, in an example implementation using H.264/AVC as the multi-view encoder for implementing and integrating the framework, the search procedure is shown in FIGS. 8A and 8B. Note that because variable block-size motion estimation is supported in H.264/AVC, the example of FIGS. 8A and 8B takes this feature into account in the design of the framework, and presents an adaptive and fast implementation of the framework in a H.264/AVC encoder.

In general and as described above, a new, suitable starting search point, OPESC, is first computed and checked at the start of motion search to obtain an initial matching cost. Note that when the OPESC already gives a fairly good estimation of the optimal matching point, the unsymmetrical rood pattern search, or even the entire search process for current block motion search, can be terminated early, with only a negligible loss in the prediction performance. To adaptively decide when the unsymmetrical rood pattern search can be skipped and when the entire search process can be terminated early, basic thresholds may be used. For example, in one embodiment, the thresholds are set at TH1=1000, TH2=800, and TH3=7000, which are similar to the thresholds in the simplified UMHexagonS (a fast motion estimation algorithm in H.264 JM 10.1 model, as described in JM Reference Software Version 10.1, available online at http://iphome.hhi.de/suehring/tml/download/jm10.1.zip).

Because H.264 features variable block-size motion estimation (corresponding to a MODE from 1 to 7), the example framework also explicitly deals with multiple mode motion estimation in one adaptive fast motion estimation implementation, in which the basic thresholds for MODE 1 are adaptively modified to generate appropriate MODE-dependent thresholds for the sub-macroblock motion search. Specifically, MODE-dependent thresholds are obtained by linearly scaling the basic threshold set, with the scaling coefficient determined in proportion to the area ratio between the current search block and macroblock (MODE 1). For example, if the search sub-macroblock size is 8*8, then the new threshold TH1=1000×(8×8)/(16×16), where 16×16 is the macroblock size (i.e., the search size in MODE 1).

Including such a series of adaptive thresholds, the overall framework algorithm is represented in FIGS. 8A and 8B, with example steps described beginning at step 802 which checks the MODE value. If the MODE value is not one, that is, the mode specifies sub-modes defined in H.264/AVC, at step 804 the MPSC is used to approximate the OPESC for the block, and the process advances to step 810.

For a mode of one, step 802 branches to step 806 where the corresponding epipolar line equation (aX+bY+c=0) is computed based on the centroid coordinates of the current macroblock to be predicted. Note that this step is only executed at the start of motion search for a new macroblock.

Step 808 represents performing the orthogonal projection of MPSC onto the epipolar line to get the OPESC position. Note that this step is performed only for MODE 1.

Step 808 calculates the matching cost at OPESC. If the cost is small enough (compared with MODE-dependent TH1) as evaluated at step 812, a local diamond search is performed at step 814, and the searching process then terminated for the current block by branching to point B of FIG. 8B, corresponding to step 860. Note that step 860 represents recording the obtained best integer pixel motion vector value and the associated minimum matching cost.

Returning to step 812, if the matching cost is not small enough, step 816 conducts a local diamond search centered at OPESC to locate the position with the minimum matching cost, which is to later serve as the center for an unsymmetrical rood pattern search. In general, this step refines the OPESC, because the calculation of OPESC is based on the fundamental matrix, which may be affected by digitization effects and computation precision.

Step 818 adaptively determines whether to bypass or conduct the unsymmetrical rood pattern search, based on the comparison result between the current minimum matching cost and different thresholds for motion estimation under different MODES (i.e., MODE-dependent TH2 and MODE-dependent TH3). The process continues to Point A (step 842) of FIG. 8B to evaluate the determination.

If at step 842 the rood pattern search is not to be skipped, the process conducts the unsymmetrical rood pattern search in a center-biased search order before continuing to step 846. Otherwise, the process skips this search and advances directly to step 846.

Step 846 determines whether the MODE value represents a sub-mode, that is, whether the MODE is greater than one. For sub-modes defined in H.264/AVC, step 848 calculates the matching cost for the predicted point based on up-layer motion vector prediction. If at step 850 the calculated matching cost has a smaller matching cost than the smallest one found in previous steps, the current cost and position are stored at step 852 as the search result.

Step 854 checks whether the search process can be terminated now, by comparing the current minimum cost with the same thresholds (MODE-dependent TH1) used at step 810 of FIG. 8A. If so, the search is terminated by branching to step 860 to return the results, otherwise step 858 is performed to conduct a recursive local diamond search up to some maximum looping time (e.g., four) to refine the motion search, before continuing to step 860. As described above, step 860 represents recording the obtained best integer pixel motion vector value and the associated minimum matching cost.

Turning to another aspect, the framework can be further accelerated via an incremental computation method for the epipolar line equation and rood search pattern. To this end, with double-precision floating-point arithmetic intensively used to derive the epipolar line equation and also the positions of the unsymmetrical rood pattern, there is set forth an incremental computation method that largely decreases the overhead of floating-point operations. As can be readily appreciated, such an aspect is quite desirable for platforms with weak floating-point processing capabilities.

As shown in FIG. 2, for each macroblock to be predicted in $I_2$, one straightforward approach to obtain the corresponding epipolar line $l_1$ in $I_1$ is to left multiply the macroblock centroid coordinates $p_2$ by F using the equation (1). However, this approach results in nine floating-point multiplications and six floating-point additions for each macroblock. Considering the regular macroblock encoding order and fixed macroblock size, a more efficient incremental epipolar line equation computation is set forth below:

(a) Traverse along the same scanline (same y):

$$l_{curr} = F \cdot \tilde{p}_{curr} = F \cdot \begin{bmatrix} x_{prev} + 16 \\ y_{curr} \\ 1 \end{bmatrix} = F \cdot \begin{bmatrix} x_{prev} \\ y_{curr} \\ 1 \end{bmatrix} + F \cdot \begin{bmatrix} 16 \\ 0 \\ 0 \end{bmatrix} = l_{prev} + \Delta l_x$$

(b) Traverse to the start of a new scanline (start x at 8):

$$l_{curr} = F \cdot \tilde{p}_{curr} = F \cdot \begin{bmatrix} 8 \\ y_{prev} + 16 \\ 1 \end{bmatrix} = F \cdot \begin{bmatrix} 8 \\ y_{prev} \\ 1 \end{bmatrix} + F \cdot \begin{bmatrix} 0 \\ 16 \\ 0 \end{bmatrix} = l_{prev} + \Delta l_y.$$

Therefore, to get the corresponding epipolar line equation for any macroblock in a frame, only the epipolar line parameters $l_0$ ($a_0$, $b_0$, $c_0$) need to be computed for the first macroblock of this frame, and also the horizontal increment vector $\Delta l_x$ and vertical increment vector $\Delta l_y$. Increasing the immediate previously visited macroblock's epipolar line parameters $l_{prev}$ by $\Delta l_x$ or $\Delta l_y$, the current epipolar line equation (i.e., $l_{curr}$) can be easily obtained with only three floating-point additions.

Following the same approach, the floating-point computation for the coordinates of unsymmetrical rood pattern may be simplified. To this end, only the OPESC needs to be calculated, while the other positions can be incrementally obtained by adding the epipolar line gradient −a/b. To guarantee a center-biased rood search order, two temporary variables are used to store the previous positions leading to positive and negative directions.

The resulting complexity overhead of these two modules consumes less than 1.2 percent of the total motion estimation computational cost. In fact, this portion of calculation can be further accelerated for online multi-view video coding by looking up the pre-stored tables, if the initial multi-view camera setup stays unchanged in the capture process. Because the epipolar constraint only concerns the relative positions and poses of the cameras, the complexity of the scenes or the content of the frames to be encoded does not affect the epipolar line equations and rood search patterns.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one physical method comprising:
   determining a point within a macroblock to be predicted;
   computing an epipolar line based on the point within the macroblock to be predicted;
   determining a temporary starting point in the macroblock to be predicted, wherein computing the epipolar line comprises determining fundamental matrix F based on a relative position of first and second cameras to be predicted the macroblock to be predicted;
   determining a search starting point based on the temporary starting point and the epipolar line; and wherein the method is performed by a computer.

2. The at least one physical method of claim 1 wherein determining the point within the macroblock to be predicted comprises computing a centroid point of the macroblock to be predicted.

3. The at least one physical method of claim 1 wherein determining the temporary starting point comprises determining a median predicted search center.

4. The at least one physical method of claim 1 wherein determining the search starting point comprises determining a projection point on the epipolar line that is substantially orthogonal to the temporary starting point.

5. The at least one physical method of claim 1 wherein computing the epipolar line comprises using an equation of the form $$\tilde{P}_1^T \cdot F \cdot \tilde{P}_2 = \tilde{P}_1^T \cdot l_1 = 0$$

where $l_1$ represents the epipolar line, and where $\tilde{P}_1$ comprises homogeneous coordinates of a point's projection on a first image plane between the first camera and that point, and where $\tilde{P}_2$ comprises homogeneous coordinates of the point's projection on a second image plane between the second camera and that point.

6. The at least one physical method of claim 1 wherein computing the epipolar line comprises traversing along a scanline common to a previous scanline or a new scanline and determining a horizontal increment vector or a vertical increment vector, or both a horizontal increment vector and a vertical increment vector.

7. The at least one physical method of claim 1 wherein the method further comprises performing a search starting at the search starting point in a search area located around the epipolar line.

8. The at least one physical method of claim 7 wherein performing the search comprises performing a rotated unsymmetrical rood-pattern search, or performing at least one local diamond search, or both performing a rotated unsymmetrical rood-pattern search and performing at least one local diamond search.

9. In an image processing environment, a system comprising:
- a first module configure to compute an epipolar line based upon a point within a macroblock to be predicted;
- a second module coupled to the first module and configured to compute a search starting point based upon a temporary starting point and the epipolar line, wherein the temporary starting point corresponds to a median predicted search center; first module further configured to compute the epipolar line as parameters based upon centroid coordinates of the macroblock to be predicted and a fundamental matrix based upon relative camera positions;
- a third module coupled to the second module and configured to determine a search space based on the search starting point and the epipolar line; and
- a motion estimation mechanism configured to search the search space to produce a motion vector.

10. The system of claim 9 wherein the second module is further configured to compute the search starting point by orthogonally projecting from the temporary starting point to a point on the epipolar line.

11. The system of claim 9 wherein the third module is further configured to determine the search space as a space aligned on the epipolar line.

12. The system of claim 9 wherein the motion estimation mechanism is further configured to perform a rotated unsymmetrical rood-pattern search, or to perform at least one local diamond search, or to perform both a rotated unsymmetrical rood-pattern search and performing at least one local diamond search.

13. The system of claim 9 wherein the system corresponds to a fast motion estimation framework in a multi-view environment, or corresponds to a fast motion estimation framework in an H.264/AVC environment, or corresponds to a fast motion estimation framework in a multi-view environment and an H.264/AVC environment.

14. In an image encoding environment, a method comprising:
- computing epipolar line parameters corresponding to a macroblock to be predicted;
- determining a search point on the epipolar line;
- conducting at least one search including evaluating at least one threshold value to determine a matching point and a motion vector correspond to the matching point; and wherein the conducting the at least one search comprises determining a search space aligned on the epipolar line; and wherein the method is performed by a computer.

15. The method of claim 14 wherein conducting the at least one search comprises conducting a local diamond search centered at the search point.

16. The method of claim 14 wherein conducting the at least one search comprises conducting an unsymmetrical rood pattern search.

17. The method of claim 14 wherein conducting the at least one search comprises conducting a recursive local diamond search.

* * * * *